United States Patent [19]

Steigerwald et al.

[11] 4,203,023
[45] May 13, 1980

[54] WELDING POOL SUPPORT DEVICE FOR ENERGY BEAM WELDING

[75] Inventors: Karl-Heinz Steigerwald, Starnberg; Wilhelm Scheffels, Puchheim; Peter Anderl; Dieter König, both of Munich; Walther Hiller, Puchheim; Franz Rappold, Munich, all of Fed. Rep. of Germany

[73] Assignee: Steigerwald Strahltechnik GmbH, Munich, Fed. Rep. of Germany

[21] Appl. No.: 902,405

[22] Filed: May 3, 1978

[30] Foreign Application Priority Data

May 3, 1977 [GB] United Kingdom ............... 18509/77

[51] Int. Cl.² ............................................. B23K 15/00
[52] U.S. Cl. ............................ 219/121 EB; 219/160; 228/216
[58] Field of Search ................. 219/121 EB, 121 EM, 219/160; 228/50, 216

[56] References Cited

U.S. PATENT DOCUMENTS

| 2,321,308 | 6/1943 | Miller | 219/160 X |
| 2,430,266 | 11/1947 | Zimmerman | 219/160 X |
| 2,952,231 | 9/1960 | Chyle et al. | 219/160 X |
| 3,372,852 | 3/1968 | Cornell | 219/160 X |
| 3,662,144 | 5/1972 | DeHaeck | 219/160 X |

FOREIGN PATENT DOCUMENTS 51-41089 11/1976 Japan ............................. 219/121 EM Primary Examiner—Bruce A. Reynolds
Assistant Examiner—E. F. Borchelt
Attorney, Agent, or Firm—Brumbaugh, Graves, Donohue & Raymond

[57] ABSTRACT

An account is given of a welding pool support device for energy beam welding, with a metal structure, which on a beam outlet side of a welding seam zone of a workpiece system is put against the beam outlet side and being in contact with it by a number of touching points for stopping any movement of melt out of the welding zone, which is achieved by the energy beam in the workpiece system, by a relative movement of the energy beam and the workpiece system, the former going along the weld seam zone. A supporting structure, which is able to be so changed in shape that it takes into account uneven parts of the beam outlet side of the workpiece system in the long direction and also in the cross-direction of the weld seam zone. Furthermore the supporting structure is so designed at the side touching the beam outlet side that the distances between the points of touching from each other and from the parts placed between them, of the supporting structure, that gases, produced in the welding zone near the beam outlet side, are able to come out through the supporting device.

13 Claims, 8 Drawing Figures

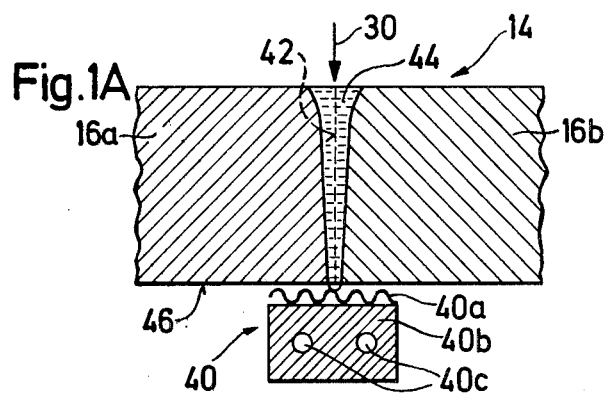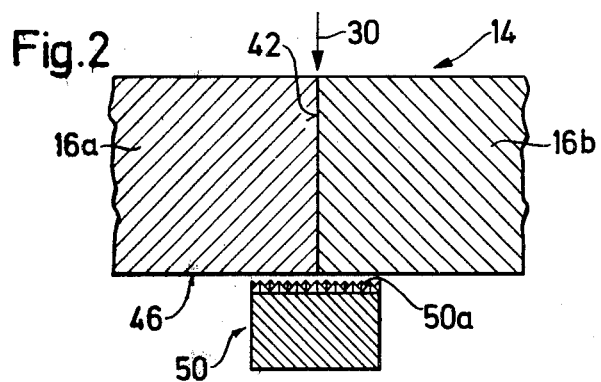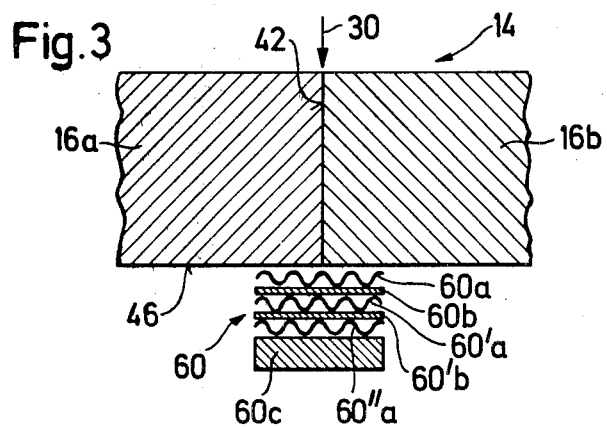

WELDING POOL SUPPORT DEVICE FOR ENERGY BEAM WELDING

BACKGROUND OF THE INVENTION (1) Field of the Invention

The present invention has to do with a welding pool support device for energy beam welding, with a metal structure, which on a beam outlet side of a welding seam zone of a workpiece system is put against the beam outlet side and being in contact with it by a number of touching points for stopping any movement of melt out of the welding zone, which is achieved by the energy beam in the workpiece system, by a relative movement of the energy beam and the workpiece system, the former going along the weld seam zone.

(2) The Prior Art

On welding thick workpiece using an energy beam, in particular an electron beam, the melt produced by the energy beam in the welding zone has a tendency to move out of the welding zone, since welding of thick workpieces has to take place at a low speed, that is to say relative movement of the energy beam and the workpiece system. The tendency of the melt to move out of the welding zone is very strong in the case of vertical direction of the energy beam.

For stopping any movement of the melt out of the welding zone the melt has to be supported by an adequate element. This is possible for example by putting a block of material, which is identical with the material of the workpiece system to be welded, against the beam outlet side of the workpiece system. In case of welding with an energy beam coming down in vertical direction it is put against the lower side of the weld seam zone. With energy beam welding, a certain part of the beam always comes out of the backside of the workpiece system and this part then goes into the support material. Thus, the latter is melted and, on re-solidification, is firmly joined to the workpiece system. Separating a solid support body from the workpiece system is difficult and expensive.

It has furthermore been noted that in zones near the beam outlet side of the weld seam there are shortcomings such as hollow spaces, if the support material is tightly touching the beam outlet side; obviously gases which segregate from the welding zone which, are not able to get out, because the weld pool support material comes up close against the weld outlet side, and cause detrimental hollow spaces.

Attempts have been made to overcome these troubles by using a trough as a weld pool support, which has in it wires being oriented in the direction of the weld seam zone so that, for the welding operation the wires are put against the beam outlet side of the workpiece system. Furthermore a stack of sheet metal strips has been used for support of the pool. The strips are placed on edge and are put against the beam outlet side.

Though it is true that these structures for supporting the pool are more easily taken away after welding than a solid supporting body, as seen in the direction of their length they do not make allowance for uneven parts of the workpiece system very well, if the surface of the workpiece system is uneven, so that the pool supporting effect is not made certain, while on the other hand on a smooth beam outlet side or smooth part of it on the two sides of the weld seam zone they frequently have such a tightening effect that gases, segregating from the weld near the beam outlet side, are not able to come out of the material on the beam outlet side, which then causes detrimental hollow spaces.

SHORT SURVEY OF THE INVENTION

On purpose of the present invention is that of making a weld pool support device for energy beam welding, more particularly electron beam welding, which makes quite certain of the necessary pool support though at the same time at the beam outlet side it makes it possible for gases to come out of the welding zone. Furthermore after welding it is to be easily taken off.

In the present invention a welding pool support device has a supporting structure, which on being put against the weld seam zone of the beam outlet side of a workpiece system is so changed in shape that it takes into account of uneven parts of the beam outlet side of the workpiece system in the longitudinal as well as in the transversal direction of the weld seam zone; furthermore the supporting structure is so designed at the side touching the beam outlet side that the distances between the points of touching from each other and from the parts placed between them, of the supporting structure, that gases, segregating in the welding zone near the beam outlet side, are able to come out through the supporting device.

The supporting structure of the invention creates conditions, which, as has been noted by us, are important for good support of the welding pool, that is to say:

(a) The supporting structure takes into account the geometry of the weld seam zone of the workpiece system well so that the melt cannot get out. This goes as well for edges, not completely in line, of a joint between two workpiece parts.

(b) Between the weld seam zone on the beam outlet side on the one hand and the vacuum space near it there are enough channels for making certain of the necessary evacuation and taking off of gases in the part, near the beam outlet side, of the welding zone (weld seam root).

(c) The supporting structure is low in price to make and simple in use.

(d) It is possible to make the supporting structure with such a heat capacity that quick solidifying of the melt which comes out of the welding zone to the supporting structure, is made certain without any strong connection being made between the weld seam after solidification and the supporting structure, so that later separating of the parts would be hard.

LIST OF VIEWS OF DRAWINGS

Forms of the invention, a welding pool support device, will now be made clear using the drawings.

FIG. 1A is a view, on a greater scale, of a part of the workpiece system to be seen in FIG. 1 and of the welding pool support device.

FIG. 2 is a view, on the same lines as FIG. 1A, of a workpiece system and a second form of the welding pool support device made by the invention.

FIG. 3 is a view like FIG. 1A with a further form of the invention.

ACCOUNT OF FORMS OF THE INVENTION

Figure 1:
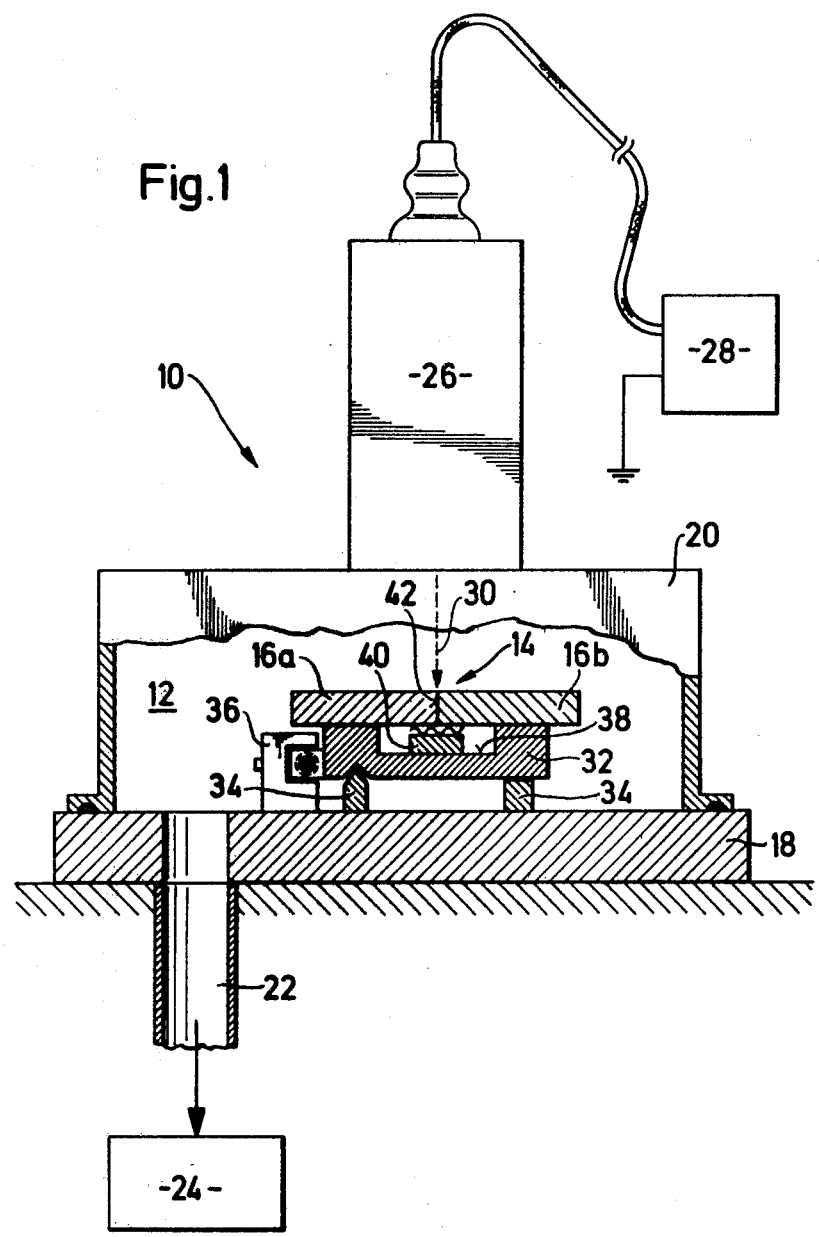
FIG. 1 is a diagrammatic section-view of an electron beam welding machine with a workpiece system to be welded and a welding pool support device on the lines of one form of the invention.

In FIG. 1 we see an electron beam welding machine 10 in a very simple form. It has a vacuum chamber 12 for a workpiece system 14, for example two thick plates 16a and 16b to be welded together. The vacuum chamber is formed by a base-plate 18 and a box-like chamber 20 placed on the base-plate 18 with a gas-tight connection. Through a vacuum line 22 and using a vacuum unit 24 (not in the drawing) a vacuum is produced. On the top of the chamber there is an electron beam gun 26 joined with a power and control unit 28. An electron beam 30 is produced by the gun 26 which has for example an acceleration voltage of 150 kilovolts and a beam current of some milliamperes. Electron beam welding machines of this sort are existing and on the market. Details about electron beam welding are given for example in the U.S. Pat. Nos. 2,987,610 and 3,448,240.

The workpiece system 14 is on a rest 32, able to be moved on slip-rails 34, in a direction perpendicular to the plane of FIG. 1. The movement is produced by a driving unit 36 of normal design, which is joined with the rest 32 by a threaded rod and a nut running on the rod.

The rest 32 has a recess, which when looked at in the direction of the beam 30, is under the workpiece system 14. In this recess 38 a welding pool support device 40 is placed, of which a detailed account is to be given using FIG. 1A.

On welding the electron beam 30 goes towards a joint 42 between the two plates 16a and 16b to be welded and made for example of steel and having a thickness of 50 mm or more. A welding zone is produced, which is in the form of a melt of workpiece material and possibly in addition material put into the welding zone from outside (additive). When the workpiece system 14 is moved by the driving unit 36 in the direction of the joint 42 the weld zone goes along the joint 42 and the two plates 16a and 16b are joined together in the normal way, a solid weld seam being formed.

The weld zone, having the melt 44 in it, and the welding pool support device 40 are to be seen in more detail in FIG. 1A. The welding pool support device 40 is made up of a layered structure 40a and a solid supporting rail 40b, by which the layered structure 40a is put in the welding seam zone up against the beam outlet side 46 of the workpiece system 14.

The layered structure 40a is so made that it is able to take into account uneveness of the beam outlet side 46 in the long direction and in the cross-direction as well of the weld gap 42, when it is put against the beam outlet side 46 by the support rail 40b, with a large number of touching points on the beam outlet side. The points of touching are in this respect to have such a spacing between them that channels are still in existence, which are joined with the inner space 12 of the vacuum chamber and have such a cross-section that gases, which are freed by the electron beam 30 in the welding zone near the beam outlet side, go from the beam outlet side into the vacuum space. Furthermore the layered structure together with the thermal up-take capacity of the supporting rail 40b is to have such a capacity for the taking away of heat that the melt 44 goes over into the solid form quickly, when the electron beam 30 goes further along the joint 42. The distances between the touching points and the size of the ducts or channels is limited by the need for the layered structure to be able to generally make impossible any loss of melt.

As the layered structure 40a it is possible to make use for example of a corrugated, bossed or otherwise formed metallic sheet with a thickness of for example 0.5 to 1.5 mm, while as a support rail it is possible to use an iron or copper rail with a cross-section of for example 50×100 mm, and if desired it has a cooling system as for example cooling channels 40c. The layered structure may furthermore be made of felted material of metal wires or a coarser metal fabric, so as to be in line with the needs noted earlier.

In particular at least the layered structure 40a is made of the same or a like material as the material of the workpiece system 14 so that the quality of the weld seam made is not decreased by the making of an undesired alloy between the material of the workpiece system and that of the layered structure.

The form of the welding pool support device to be seen in FIG. 2 has a single part, that is to say a support rail 50. In order to keep up with the conditions noted earlier, the support rail 50 has a knurled face 50a, which is put against the beam outlet side 46 of the workpiece system 14. The knurled or bossed face 50a has a large number of pyramid-like lumps, whose ends have for example a spacing of 1 to 5 mm between them. The height of the separate lumps is of the same order.

The support rail 50 is more particularly made of a soft material, such as soft iron, so that the lumps are made somewhat flatter and take into account the uneven parts when the lumps are pushed against the beam outlet side 46. The degree to which the support device is able to take into account uneven parts on the beam outlet side is naturally limited in this case.

FIG. 3 has a form of the welding pool support device of the invention, which may be regarded as a change in the form of FIG. 1A. The welding pool support device 60 of FIG. 3 has a layered system made up of a corrugated structure 60a, which goes up against the beam outlet side 46 of the workpiece system 14 and then has, taken in order, a flat piece of sheet metal 60b, a second corrugated structure 60'a, a second flat piece of sheet metal 60'b, a further corrugated structure 60"a and lastly a support rail 60c.

The corrugated structures 60a, 60'a and 60"a may be made as noted earlier in connection with FIG. 1A. The layer system may as well only have the two corrugated structures 60a and 60'a with smooth sheet metal 60b in between them or a larger number of corrugated structures with alternating pieces of sheet metal may be used. The smooth sheet metal pieces 60b and 60'b may be perforated. The welding pool support device 60 of FIG. 3 is of particularly good effect in cases in which the beam 30 on coming out from the beam outlet side 60 still has a high energy and for this reason goes deeply into the welding pool support device 60.

Figure 4:
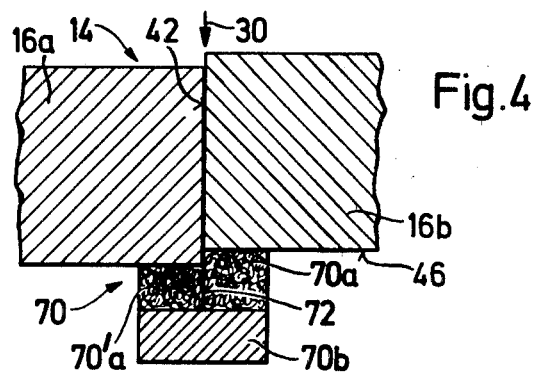
FIG. 4 is a view like FIG. 1A of a still further form of the invention.

FIG. 4 is a view of a welding pool support device 70, which is of particularly good effect even if the edges of the plates 16a and 16b, to be welded together, are somewhat out of line. The welding pool support device 70 has two compressible long structures 70a and 70'a with a quadrangular cross-section, which are able to be made for example of felted metal wires, pieces of metal sheets with bosses or corrugations and in any case of uneven form, and the like. The structures 70a and 70'a are so placed against the beam outlet side 46 of the workpiece system 14 that their touching face 72 generally is running on from the butt joint 42 in line with it. Then the two structures 70a and 70'a are pressed for example using a solid loading rail 70b made of four-cornered metal rod, against the beam outlet side. The structures 70a and 70b are in this case as well to be in line with the conditions noted earlier, which make certain that the melt is kept back in the desired way and takes on its solid form quickly and that at the same time gases, produced in the welding zone, are able to come clear of the weld outlet side 46 of the workpiece system.

Figure 5:
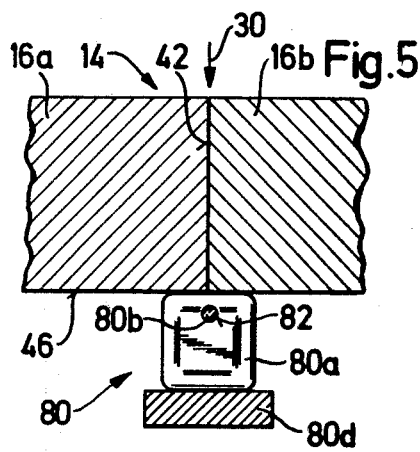
FIG. 5 is a view like FIG. 1A of a still further form of the invention.
Figure 6:
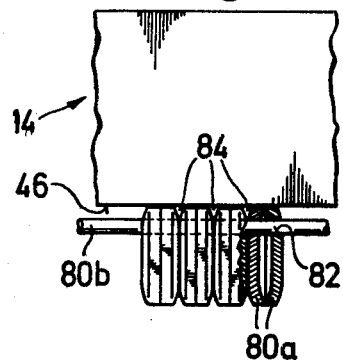
FIG. 6 is a side-view, partly cut through, of a part of the welding pool support device of FIG. 5.

FIGS. 5 and 6 are views of a welding pool support device 80, made of a stack of quadrangular metal plates 80a with holes. The plates are made for example of metal with a thickness of about 0.5 to 2.5 mm. They are made by punching out from a sheet of metal. They are to be somewhat curved, for example having somewhat bent up edges, something which is the natural outcome of making by punching out. The metal plates have a somewhat eccentric hole 82 formed on punching out of the plate for example. If the metal plates 80a are put in a row on a support rod 80b in such a way that alternately two concave and two convex sides of the metal plates 80a come up against each other, as to be seen in FIG. 6, the outcome is a welding pool support device in line completely with all necessary conditions. The plates 80a placed in a row on the support rod 80 (FIG. 6) are then pressed by a support rail 80b against the welding seam zone of the beam outlet side 46 of the workpiece system. The edges, near the hole 82, of the plates come up against the beam outlet side 46. Because the plates 80a can be turned on the support rod 80b, uneven parts are readily taken into account. Because of the placing of the plates noted at the edge of two plates 80a having their concave sides touching, small V-like openings are formed, through the gases are able to get out of the welding zone and they are pumped off.

Figure 7:
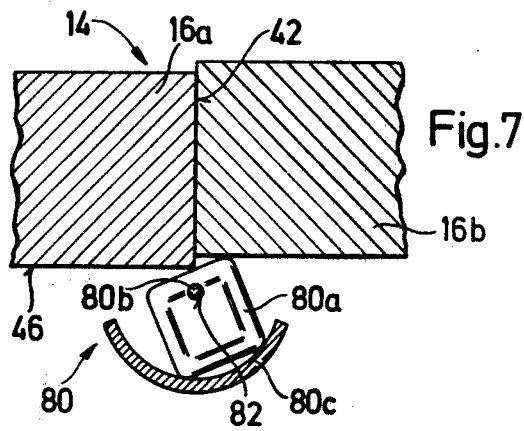
FIG. 7 is a view like flange 5 of a different form of the system of FIG. 5.

If the beam outlet side 46 is very uneven, when for example the edges of the parts to be welded together of the workpiece system 14 are not quite in line, the welding pool support device of FIG. 5 can in particular be changed as seen in FIG. 7 so that in place of the quadrangular loading rail 80b a trough-shaped loading rail 80c is used, which makes certain of a generally even touching of the metal plates 80a against the beam outlet side 46 even if the metal plates are twisted in relation to each other.

All welding pool support devices of the invention come up against, more particularly, the beam outlet side at a large number of touching points. The touching points are to be in a regular or non-regular two-dimensional order running in the longitudinal direction and also in the transversal direction of the weld seam. The parts, forming the touching points, of the system are to have at least a limited ability of moving, of being elastic or being changed in shape in the direction at right angles to the beam outlet face so that the weld seam zone is well sealed off for stopping any loss of melt while at the same time however spaces are made in between, through which the gases are able to come out.

We claim:

1. A welding pool support device for energy beam welding in a vacuum, with a metal structure, which on a beam outlet side of a welding seam zone of a workpiece system is put against the beam outlet side and goes up against it at a number of touching points for stopping any movement of melt out of a welding zone, which is produced by the energy beam in the workpiece system and on a relative movement of the energy beam and the workpiece system goes along the weld seam zone, characterised by a supporting structure, which can be so changed in shape that it takes into account uneven parts of the beam outlet side of the workpiece system in the longitudinal direction and also in the transversal direction of the weld seam zone; furthermore the device and the portion of the supporting structure touching the beam outlet side are so irregular and open that the distances between the points of touching from each other and from the parts placed between them, of the supporting structure, permit gases, developing in the welding zone near the beam outlet side, to freely flow out through the supporting structure and device.

2. A device as given in claim 1, characterised by a layered structure easily permeable to gas, and a support rail by which the layered structure is put against the beam outlet side.

3. A device as given in claim 2, characterised in that the layered structure is made of sheet metal with uneven parts with a size of the order at least of 1 millimeter.

4. A device as given in claim 2, characterised in that the layered structure is made of coarse wire felt.

5. A device as given in claims 2, 3 or 4, characterised in that between the support rail and the layered structure there is at least one generally smooth piece of sheet metal and at least one further layered structure.

6. A device as given in claim 1, comprising a metal rail having a face comprising said supporting structure for being placed against the beam outlet side of the workpiece system, said face being provided with a number of bosses able to be changed in shape.

7. A welding pool support device as given in claim 1, wherein said supporting structure comprises two rod-like structures able to be pushed together, and which have a loose structure through which gases but not melt may flow away from the seam zone and wherein said device includes a loading rail, by which these structures are able to be put against the beam outlet side.

8. A device as given in claim 1, characterised by a stack of metal plates which are placed in a row on a supporting element and are so shaped that at a side for touching the beam outlet side of the stack, channels are formed, through which gas though not melt is able to get out of the welding zone, and by a loading device for pressing the stack against the beam outlet side of the workpiece system.

9. A device as given in claim 8, characterised in that the loading device is a trough-shaped rail.

10. A device as given in claim 8 or claim 9, characterised in that the plates of the plate stack are somewhat curved and come up against each other alternately at their concave and convex sides.

11. A device as given in claim 8 or 9, characterised in that the plates have an eccentric hole, through which the support element goes.

12. A device as given in claim 1, characterised in that said distance is between 1 and 5 mm and in that the spaces between said points of touching communicate with the space surrounding said device over channels, most of which have cross sections of at least 1 mm$^2$.

13. A device as given in claim 1, 2, 3, 4, 6, 7, 8, 9 or 12, characterised in that the points of touching are parts of the device which make a mechanically joined structure.

* * * * *